United States Patent

Hanson

[11] Patent Number: 5,877,750
[45] Date of Patent: Mar. 2, 1999

[54] METHOD AND APPARATUS FOR IN-PLACE LINE WIDTH SELECTION FOR GRAPHICS APPLICATIONS

[75] Inventor: Gary Robert Hanson, Boca Raton, Fla.

[73] Assignee: International Business Machines Corporation, Armonk, N.Y.

[21] Appl. No.: 713,681

[22] Filed: Sep. 17, 1996

[51] Int. Cl.[6] ....................................................... G09G 5/00
[52] U.S. Cl. ......................... 345/173; 345/179; 345/180; 178/18.01; 178/18.03; 178/19.01
[58] Field of Search ..................................... 345/173, 157, 345/179, 180, 181, 443; 178/18–20, 18.01, 18.03, 19.01; 364/709.01, 709.11; 349/12

[56] References Cited

U.S. PATENT DOCUMENTS

| | | | |
|---|---|---|---|
| 3,871,776 | 3/1975 | Braun ........................................ | 401/256 |
| 4,318,096 | 3/1982 | Thornburg et al. ...................... | 340/706 |
| 4,454,507 | 6/1984 | Srinivasan et al. ..................... | 340/744 |
| 4,831,568 | 5/1989 | Ito ............................................ | 364/709.11 |
| 5,155,813 | 10/1992 | Donoghue et al. ..................... | 345/179 |
| 5,297,254 | 3/1994 | Arai et al. ................................ | 395/161 |
| 5,300,927 | 4/1994 | Arai et al. ................................ | 345/157 |
| 5,325,110 | 6/1994 | Tang et al. ............................... | 345/157 |
| 5,341,152 | 8/1994 | Arai et al. ................................ | 345/133 |
| 5,434,370 | 7/1995 | Wilson et al. ............................ | 178/18 |
| 5,594,855 | 1/1997 | Von Ehr, II et al. .................... | 345/442 |
| 5,623,129 | 4/1997 | Mallicoat ................................. | 178/18 |
| 5,635,683 | 6/1997 | McDermott et al. .................... | 178/18 |

FOREIGN PATENT DOCUMENTS

| | | |
|---|---|---|
| 5-173706 | 7/1993 | Japan . |
| 5-282094 | 10/1993 | Japan . |
| 6-301483 | 10/1994 | Japan . |

*Primary Examiner*—Jeffery A. Hofsass
*Assistant Examiner*—Ashok Mannava
*Attorney, Agent, or Firm*—Richard A. Tomlin; Michael J. Balconi-Lamica

[57] ABSTRACT

In-place line width selection for use in a computer based graphics application employing a drawing tool includes the steps of (i) activating a line width selection mode upon an occurrence of a first event designating an initial point of contact in a drawing area by the drawing tool; (ii) growing an "ink-spill" to a desired line width dimension at the initial point of contact in the drawing area; and (iii) entering a graphic line drawing mode with the drawing tool for drawing a graphic line having the desired line width dimension selected according to the "ink-spill" grown in the previous step.

17 Claims, 3 Drawing Sheets

METHOD AND APPARATUS FOR IN-PLACE LINE WIDTH SELECTION FOR GRAPHICS APPLICATIONS

BACKGROUND OF THE INVENTION

1. Field of the Invention

This invention relates to computer based graphics applications employing a drawing stylus or cursor movement device, or the like, and more particularly, to a method and apparatus for line width selection using the drawing stylus or cursor movement device.

2. Discussion of the Related Art

Computer based graphics applications utilize the operating systems of the computers upon which the applications are installed and being run. A typical computer based graphics application may utilize a computer, monitor or display device, keyboard, and mouse. Alternatively, the graphics application may utilize a pen and a tablet for entering drawing information into the computer.

When using a computer based graphics application, application users often need to change the effective line width of their stylus, whether the stylus is a pen or a mouse. In order to do so, the user typically must navigate through a series of menus, smart icons, control buttons and/or data entry fields before making a final line width selection. The stylus itself is often used for navigating through the series of menus, smart icons, control buttons, and data entry fields. Such navigation can become time-consuming and tedious if the user is frequently changing the line widths throughout the course of a drawing session. In addition, the use of the stylus as the pointing device during the line width selection process results in a further disadvantage to the user in that the selected width can not be seen in context with the drawing until the user has made a selection and begun to draw with the new selection. In other words, the user cannot view a selected width immediately in the drawing area. If the width is found to be unacceptable by the user, an "undo" or "erase" function must then be selected, thereby creating another frustrating distraction for the user. Finally, the granularity and size of the line width selections is usually quite limited, often due to the mere fact that only a few representative images depicting the widths can be displayed at any one time.

In summary, various problems associated with known line-width selection methods are that the methods involve the use of menu lists, smart icons, control buttons (such as, increment and decrement arrows), and/or a requirement for data entry fields. In addition, a stylus must be moved from the drawing area for making a line-width selection. A limited number and range of line-widths are usually available. A limited granularity of widths is also typically available. Furthermore, one cannot view a selected width immediately in the drawing area.

In addition to the above, one example of line width selection for a computer based graphics application is disclosed in U.S. Pat. No. 4,831,568, entitled "HANDWRITTEN-IMAGE INPUT APPARATUS" and issued May 16, 1989 to Ito. The '568 handwritten-image apparatus includes a pen, a controller, a display device, and a tablet. The tablet detects the position of the pen thereon. The display device displays a trace made by the pen on the tablet, under control of the controller. The pen includes a switch for detecting whether or not the pressure applied to the pen exceeds a predetermined value. When the switch is ON (i.e., the pressure applied to the pen exceeds a predetermined value), the controller controls the display device to increase the line width of the trace, made by the pen, which is displayed on the display device. When the switch is OFF (i.e., the pressure applied to the pen is less than a predetermined value), the controller controls the display device to decrease the line width of the trace, made by the pen, which is displayed on the display device. When the width of the displayed trace made by the pen reaches a predetermined value, the controller does not increase the line width any further.

As discussed above, the '568 handwritten-image apparatus discloses a method for line width selection; however, the '568 apparatus suffers various disadvantages. For instance, the '568 apparatus is pressure sensitive, with the pressure controlling the pen trace width throughout an entire drawing session. As a result, unintentional changes in pressure may result in unintentional and undesirable changes in line width. Another disadvantage of the '568 apparatus is that its line width is a function of the overlaying of static images (i.e., bitmaps), which is further dependent upon an available memory of the system running the drawing application for a range of sizes and resolution. While an interpolation is performed to smooth edges between patterns along a line, the '568 apparatus still depends upon the available static pattern images to provide the necessary changes in line width size.

Use of static image patterns by the '568 apparatus to draw a line also results in a less efficient mechanism for handling both screen resolution changes and color changes. For example, in general, bitmaps contain their own color information. Therefore, if it is desired to change the color(s) in the bitmaps, then it would require manipulating the bitmap information in each image. The latter is normally a complex task. Furthermore, with any changes of display resolution by the user of the '568 apparatus, the user cannot expect to be able to draw a maximum line width that is the same viewable size across all resolutions. That is, for example, if in a VGA mode the maximum pattern size allows a line 2 inches in width, then a super-VGA mode with twice the resolution would now allow only a maximum line width of 1 inch. This is a distinct deficiency.

Still further, the '568 apparatus is "hardware constrained". That is, it is intimately intertwined with special hardware and is not believed to be easily portable to standard, user initiated event-driven operating systems. In addition, most bitmap representations are specific to an individual operating system or a subset of operating systems. Therefore, an application using the method disclosed by the '568 patent would probably have to maintain separate bitmap images for each operating system it wants to work on. While the later is not extremely difficult, it does add an undesirable extra element of complexity.

SUMMARY OF THE INVENTION

An object of the present invention is to eliminate clutter, distractions, tedium and frustrations accompanying known systems, to thereby provide, in a human-centered systems environment, an elegant and user friendly solution to the screen-clutter problem in the selection of line width for graphics applications.

Another object of the invention is to eliminate menus, buttons and other non-essential visual artifacts, replacing the same with alternative mechanisms for invoking a function in the selection of line width for graphics applications.

Still another object of the present invention is to provide an improved method and apparatus for selecting line-widths for use in computer based graphics applications in a human-centered environment.

According to the present invention, an in-place line width selection method for use in a computer based graphics application employing a drawing tool comprises the steps of (i) activating a line width selection mode upon an occurrence of a first event designating an initial point of contact in a drawing area by the drawing tool; (ii) growing an "ink-spill" to a desired line width dimension at the initial point of contact in the drawing area; and (iii) entering a graphic line drawing mode with the drawing tool for drawing a graphic line having the desired line width dimension selected according to the "ink-spill" grown.

In addition, according to the present invention, an apparatus for implementing in-place line width selection for use in a computer based graphics application employing a drawing tool comprises an activation means for activating a line width selection mode upon an occurrence of a first event designating an initial point of contact in a drawing area by the drawing tool. An "ink-spill" growing means grows an "ink-spill" to a desired line width dimension at the initial point of contact in the drawing area. A line mode entering means enters a graphic line drawing mode with the drawing tool for drawing a graphic line having the desired line width dimension selected according to the "ink-spill" grown.

BRIEF DESCRIPTION OF THE DRAWINGS

A more complete understanding of the invention and its advantages may best be understood by reference to the following description taken in conjunction with the accompanying drawings. Referring to the drawings.

DETAILED DESCRIPTION OF A PREFERRED EMBODIMENT OF THE INVENTION

Turning now to FIGS. 1A–D, a graphical representation of the "ink-spill" method of in-place line width selection according to the present invention shall be described. The present invention will be also be described with reference to a generic computer-based graphics application implemented on a computer operating with any standard, user initiated event-driven operating system, as are known in the art. Furthermore, while the following discussion includes reference to use of a pen as a stylus, it is to be understood that the "ink-spill" method of the present invention can also be accomplished via other instrumentation, such as with the use of a mouse, screen touch pad, including some events executable via voice recognition instrumentation, etc.

For purposes of discussing the present invention, a computer-based graphics application, (for example, CorelDraw, available from Corel Corporation of Ontario, Canada) is assumed to have been loaded onto a programmable computer, the computer operating with any standard, user initiated event-driven operating system. The operating system may include, for example, OS/2, which is commercially available from International Business Machines Corporation, Armonk, N.Y. or Windows 95, which is commercially available from Microsoft Corporation of Redmond, Wash. The computer is further suitably programmed for carrying out the functions in accordance with the present invention, as discussed herein below. The method of in-place line width selection shall now be explained with reference to FIGS. 1 and 2 and then presented in further detail below with respect to FIG. 3.

Figure 1A:
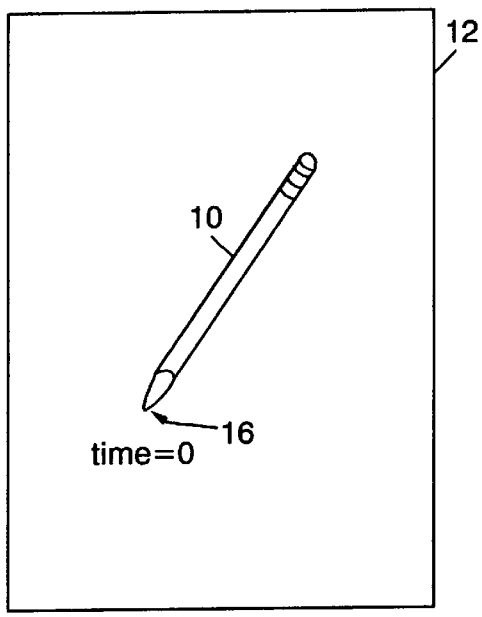
FIGS. 1A–D illustrate the method and apparatus of in-place line width selection in accordance with the present invention.
Figure 2:
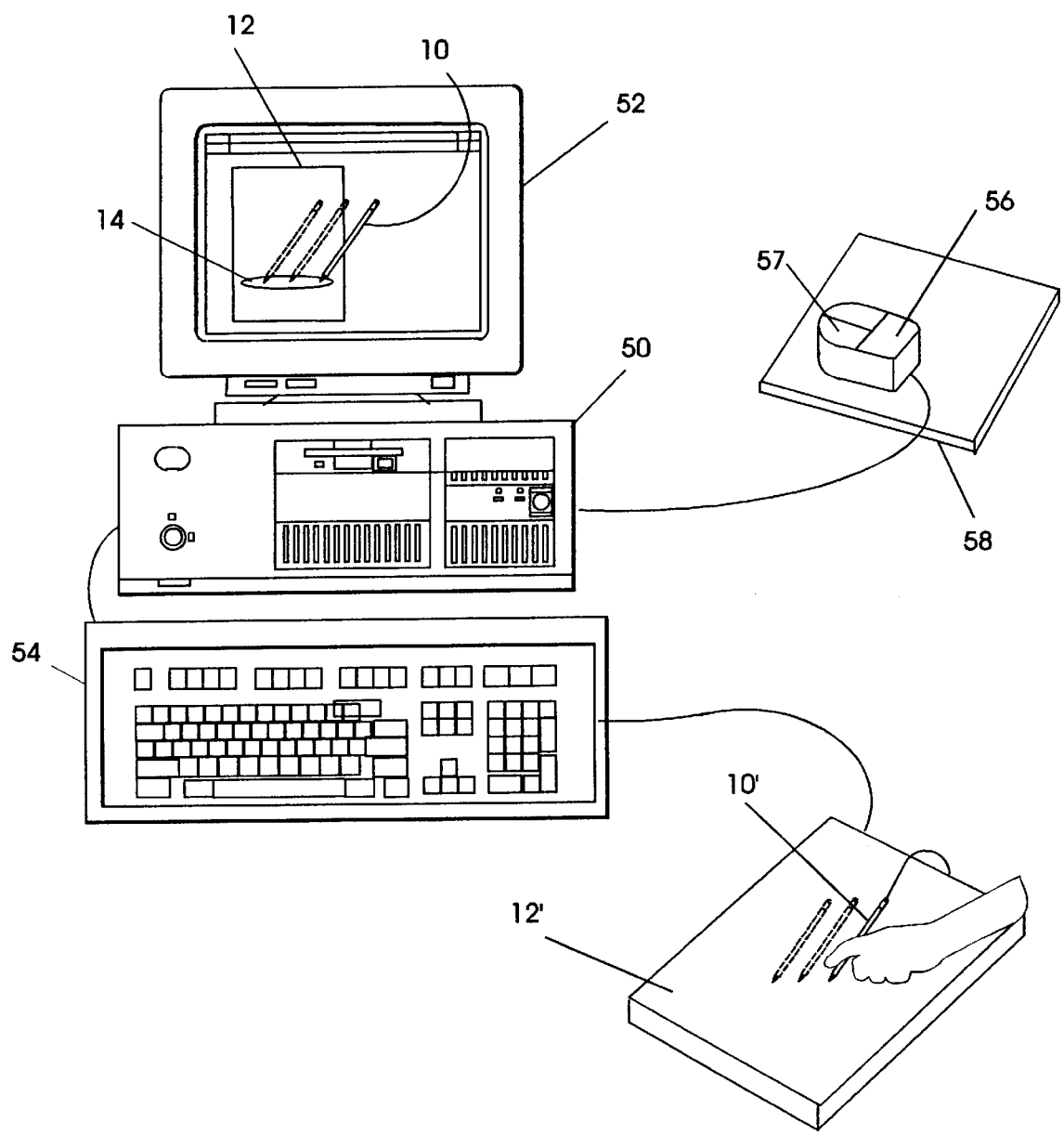
FIG. 2 illustrates an embodiment of the in-place line width selection according to the present invention.

A user initiates drawing of a line with a "pen-down" event (FIGS. 1A and 2). The "pen-down" event occurs when the user initially places the tip of a pen 10' upon a computer based writing/drawing tablet 12' corresponding to an imaged pen 10 (or cursor having any suitable shape for indicating a cursor location) and a drawing area 12, respectively, on a computer display 52. For example, pen 10' may include a pen such as is commercially available from Wacom Technology Corporation of Vancouver, Wash. In addition, tablet 12' may include a computer drawing tablet, such as is commercially available from Wacom Technology Corporation of Vancouver, Wash. Interfacing and operation of the pen 10' and tablet 12' with computer 50 and computer display 52 is to be understood as in accordance with a respective manufacturer's specifications and operating software and is thus not explicitly treated or detailed herein.

Figure 1B:
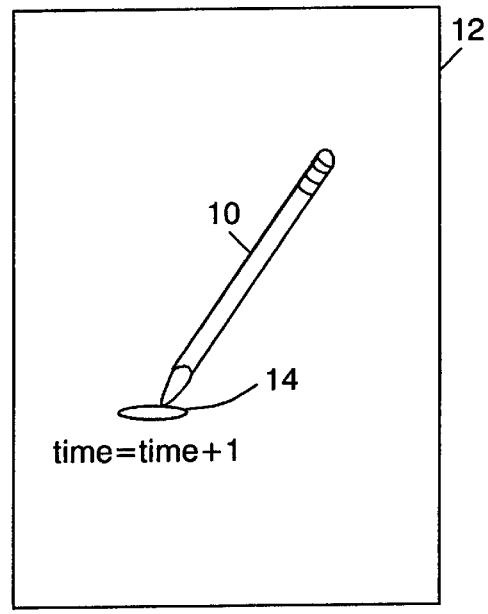
Figure 1C:
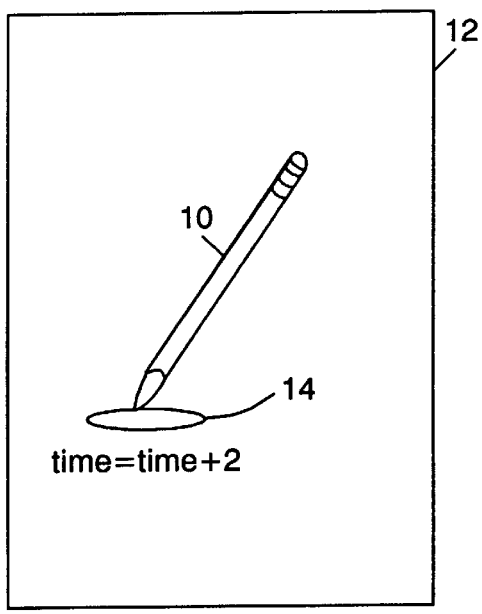
Figure 1D:
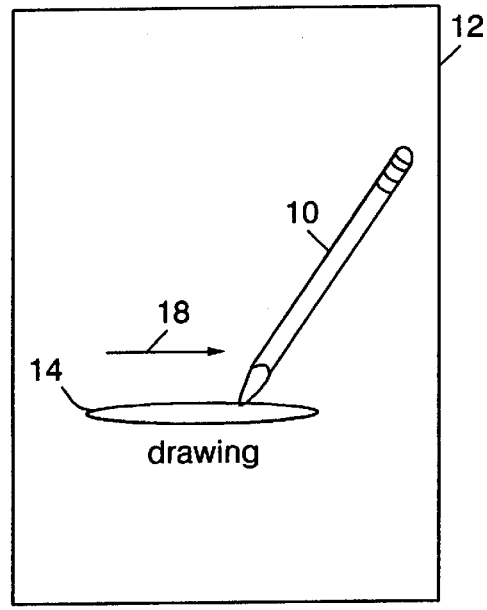

After an activation of an in-place line width selection mode, an "ink-spill" 14 begins to develop under the point of contact 16 of the pen 10 to the drawing 12 (FIG. 1B). The longer the pen 10 remains in place (corresponding to pen 10' remaining in a same place (i.e., for time=time+1, time+2, etc.), the larger the "ink-spill" 14 grows (FIGS. 1B and 1C). When the user subsequently moves the pen 10 (corresponding to pen 10' being moved, as shown by the arrow 18 in FIG. 1D), the "ink-spill" 14 immediately stops increasing and the user can now draw with the selected line-width in accordance with the "ink-spill" grown. In other words, the drawing mode is entered using a selected line-width dimension, wherein the selected line-width dimension remains the same thereafter during the drawing mode, until changed. Subsequent changes in the line width are selected and carried out as discussed herein in accordance with the present invention.

If the user is unsatisfied with the line width selected, prior to drawing a line and entering the drawing mode, the line-width can be decreased (or increased in such an instance in which the "ink-spill" is decreasing in size) by toggling the direction of "ink-spill" growth. Such toggling can be implemented by using any number of methods. For instance, toggling may be accomplished via up-down cursor arrow keyboard keys, left-right cursor arrow keyboard keys, left-right mouse buttons, etc. In a preferred embodiment, the drawing pen 10' itself is used to toggle the change in direction of "ink-spill" growth. In particular, toggling is accomplished by the use of a "single-tap" event. The "single-tap" event occurs when the user quickly raises and lowers the pen-tip to break and then make contact with the drawing surface (e.g., tablet surface) within a specified period of time. The method of allowing for the pen itself to toggle the growth direction provides a more human-centered approach. Such a preferred approach further eliminates the coupling of pen and keyboard thereby providing a more elegant and seamless solution.

Growing of the "ink-spill" is achieved by, and furthermore depends upon, a run-time construction of basic geometric patterns using trigonometry and available operating system functions which draw basic shapes without using static images. No bit-maps are required. For example, by using a built-in ellipse function of Windows 95, a filled circle or ellipse at the point of contact in the drawing area can be displayed. As shown in FIGS. 1B and 1C, the "ink-spill" is characterized by an oval shape having a particular line-width dimension, respectively. Furthermore, the line-width is two-dimensional. Other shapes are also possible, including for instance, such shapes as filled triangles, pentagons, etc. as can be formed using a poly-polygon function of the Windows 95 operating system. Such functions are typically available in most, if not all, standard operating PC operating systems. The method and apparatus of the present invention is thus less dependent on an available memory for a greater range of line width sizes and greater resolution.

In addition to the above, and further in accordance with the present invention, the use of an "ink-spill" provides both a greater granularity and range than previously available. Since the "ink-spill" 14 is dynamic in its display, two advantages accrue. A first advantage is that the increments of change can be as small as the user desires, limited only by the capabilities of the system on which the present invention is operating on. A second advantage is that a wide range of "ink-spill" sizes are available. That is, the "ink-spill" can be as tiny as a single pixel or as large as the entire display screen. With the in-place line width selection method and apparatus of the present invention, under any resolution, a user can select a line-width which fills up the entire drawing surface (or drawing screen) with a line if desired. This is accomplished by using geometric, algorithmic drawing rather than bit-mapped pattern-based drawing. Clearly, the "ink-spill" approach according to the present invention is optimal for users desiring fine control of line-width selection. In addition, a user can advantageously select a desired line-width dimension without the need to resort to menu lists, smart icons, control buttons (such as, increment and decrement arrows), and/or a requirement for data entry fields. In addition, the stylus being used for implementing the present invention is not required to be moved from the drawing area for making a line-width selection. In comparison, known graphics applications typically provide a menu or button-bar containing a limited number of line-width images for the user to select from. Not only are the selections of known graphics applications few, but they are also limited in range. Imagine trying to display a line-width image the size of the screen on a menu!

Figure 3:
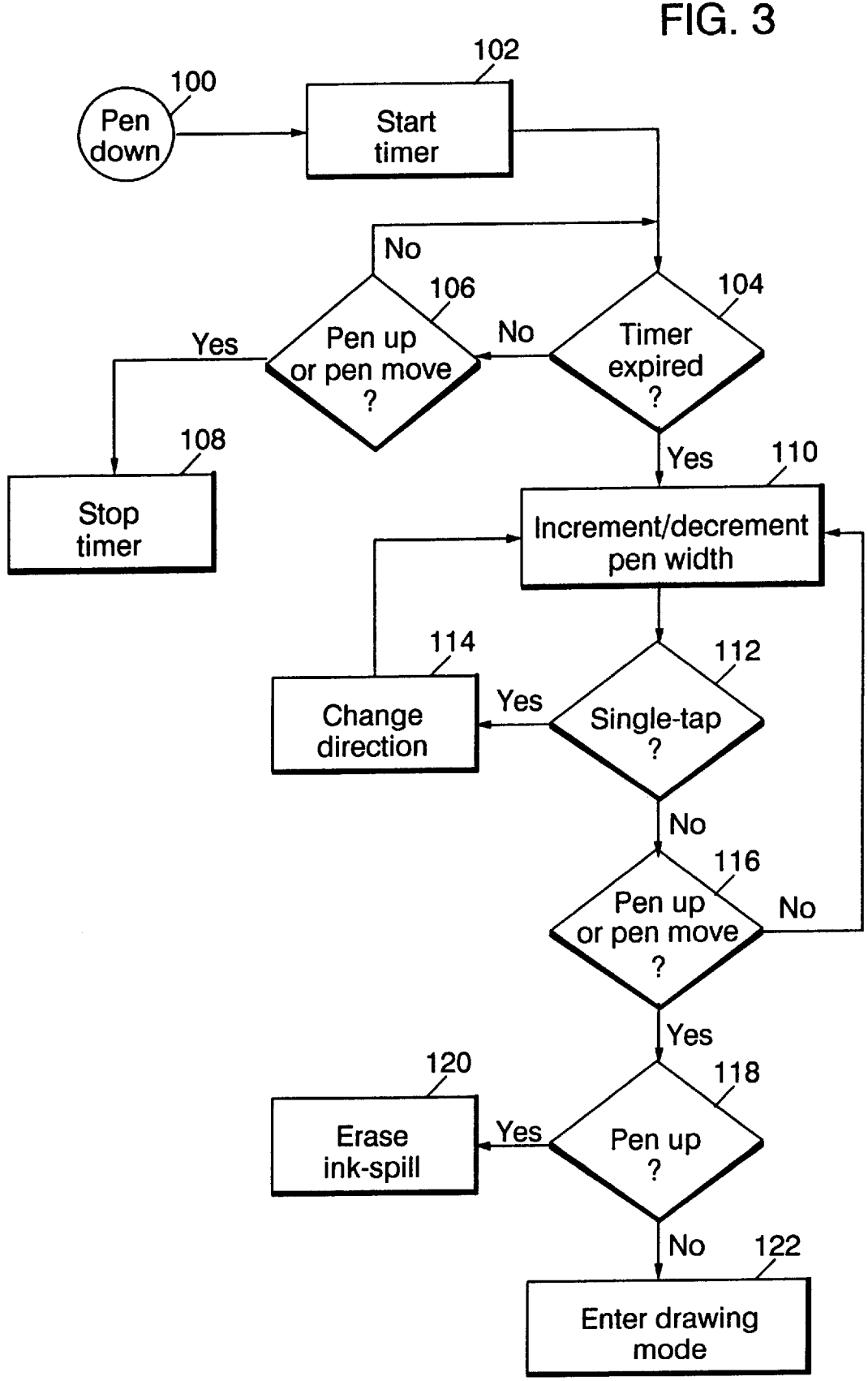
FIG. 3 is a flow chart for explaining the operation of the present invention as shown in FIGS. 1A–D and 2.

Referring now to FIG. 3, a flow-chart is shown detailing the steps used to implement the above described in-place line width selection process and its converse. Individual steps shown in FIG. 3 are readily implementable using standard programming techniques and are only discussed briefly herein. The method begins with an activation step which includes starting a timer upon the occurrence of a first event. The first event corresponds to a "pen-down" event. The "pen-down" event identifies an initial point of contact in the drawing area by the drawing tool. When the "pen-down" event is detected (step 100), the timer is started (step 102). Line-width changes do not occur until the timer expires (step 104). The timer thus advantageously allows time for the pen subsystem (not shown) to capture strokes and gestures, the pen subsystem being particular to the computer operating system used. In addition, the "pen-down" event and timer start-expiration together represents a binary activation event. If the user raises or moves the pen prior to timer expiration (step 106), then the line-width selection mode is not required and the timer is stopped (step 108). The line width selection method according to the invention thus includes aborting the activation step upon an occurrence of an aborting event during the activation step. In the example given, such an aborting event includes a "pen-up" event in which the drawing pen is lifted from the drawing surface. The aborting event may also include a "pen-move" event, in which the drawing pen is moved along the drawing surface to create a graphical line.

If, however, the timer does expire, the line-width selection mode is entered and line-width selection is activated. Upon activating and entering the line-width selection mode(step 110), the "ink-spill" begins to increase or grow. Likewise, the "ink-spill" may begin to decrease in dependence upon a preset initial setup user preference and/or a previous change in line-width selection direction. If during the change of size, the user "single-taps" the pen 10 (step 112), the direction of change in "ink-spill" size is reversed (step 114). The "ink-spill" growing step thus includes changing a direction of growth of the "ink-spill" upon an occurrence of a fourth event during the "ink-spill" growing step. The fourth event corresponds to the "single-tap" event. Such a change in the direction of growth can be from an incremental change (i.e., growing larger) to a decremental change (i.e., growing smaller). The change in direction of growth can also be from decremental to incremental.

The "ink-spill" continues to grow until the occurrence of either a "pen-up" or "pen-move" event (step 116). If, the user lifts the pen without drawing corresponding to a "pen-up" event (step 118), the "ink-spill" is removed from the display screen, i.e., erased (step 120). In this manner, should the user decide to not change the line-width from its original width, the "ink-spill" grown can be easily erased as indicated. However, when the user begins to move the pen in order to draw corresponding to a "pen-move" event, the "ink-spill" stops changing (step 116) and the drawing mode is entered (step 122). In other words, the graphic line drawing mode is entered upon the occurrence of a third event (i.e., the "pen-move" event) during the "ink-spill" growing step. In the drawing mode, the line being drawn is characterized by a line-width dimension selected in accordance with the "ink-spill" grown.

In accordance with the present invention, the selecting of a desired line width and/or initiating a change in selected line width are easily controlled. That is, a discrete set of events, "pen-down" and expiration of a timer, together acting as a "binary" event, activate the line-width selection process. In addition, during a selection of a desired line-width, separate discrete events are used to stop or reverse the change in line-width selection, each event acting as a "binary" event, as discussed herein above. Once a desired line-width is selected, the selected line-width cannot be changed unless in accordance with the present invention, thereby assuring a stable maintaining of a desired line-width selection during a drawing mode. Use of unstable pressure-sensitive switches is advantageously avoided. Still further, in-place line width selection is advantageously accomplished without the need to remove the stylus (i.e., cursor) from the drawing area. Still further, the use of menu lists, smart icons, control buttons (such as, increment and decrement arrows), and/or a requirement for data entry fields is advantageously avoided.

The steps discussed herein above with respect to FIGS. 1A–D and the FIG. 3 flow-chart apply equally to an alternate embodiment of the invention in which a mouse is used as the drawing tool or stylus. Referring again to FIG. 2, a computer 50, display monitor 52, keyboard 54, mouse 56, and mouse pad 58 are shown. The method of in-place line width selection in accordance with the present invention as discussed above is programmed and carried out on computer 50, with the differences as noted. The computer 50 operates with a standard, user initiated event-driven operating system and is further loaded with a computer-based graphics application. With respect to the present invention, a "single-tap" includes a quick release and depression of a mouse button 57 on mouse 56. Furthermore, computer 50 may include speech recognition instrumentation, wherein a speech based recognition event and/or a single click of a mouse button, together or separately, may be used for toggling a direction of change in "ink-spill" growth direction. Other implementations of a "single-tap" are also possible.

Computer 50 can thus be suitably programmed in accordance with the present invention to provide an apparatus for implementing in-place line width selection for use in a computer based graphics application. The mouse 56 can be used as the drawing tool. The display screen of the display monitor provides a drawing area. Computer 50 includes means for activating a line width selection mode upon an occurrence of a first event. In this case, the first event which corresponds to designating an initial point of contact in the drawing area refers to using the mouse 56 for identifying starting point in the drawing being drawn. For instance, a pointer on the display screen can be used to point to the initial contact or starting point in the drawing, in conjunction with a click of a mouse button, to signify the occurrence of the first event. The activation means includes means for starting a timer upon the occurrence of the first event.

Computer 50 is further programmed appropriately for growing an "ink-spill" to a desired line width dimension at the initial point of contact in the drawing area and entering a graphic line drawing mode with the drawing tool (i.e., mouse) for drawing a graphic line having the desired line width dimension selected according to the "ink-spill" grown. The "ink-spill" growing means includes means for growing the "ink-spill" upon expiration of the activation means timer until an occurrence of either a second event or a third event, the second event corresponding to a "pen-up" event and the third event corresponding to a "pen-move" event. The computer 50 is further programmed for aborting the activation means upon an occurrence of an aborting event. Computer 50 is further programmed for providing a means for erasing the "ink-spill" upon the occurrence of the second event during a growing of the "ink-spill" by the "ink-spill" growing means. Computer 50 is further programmed for providing a means for entering the graphic line drawing mode which includes means for entering the drawing mode upon the occurrence of the third event during a growing of the "ink-spill" by the "ink-spill" growing means. The system of FIG. 2 further includes means for changing a direction of growth of the "ink-spill" upon an occurrence of a fourth event during a growing of the "ink-spill" by the "ink-spill" growing means, wherein the fourth event corresponds to a "single-tap" event. The occurrence of the fourth event during the growing of the "ink-spill" by the "ink-spill" growing means results in a change in the direction of growth from incremental to decremental. A change in the direction of growth can also be from decremental to incremental.

With the method of line-selection according to the present invention, the user is able to take advantage of available built-in features of the operating system which is loaded onto computer 50. For instance, the user may be able to dynamically change the colors of the line having a line width according to the "ink-spill" as the line is being drawn.

The above-described embodiments are illustrative of the principles of the present invention. Various changes and/or modifications may be made by those skilled in the art without departing from the spirit and scope of the present invention. For example, a self-contained computer/display having a touch-screen/pen-tablet connected thereto may be utilized for implementing the present invention. In addition, voice recognition implementations may be used for effecting the "single tap" event for incrementing or decrementing the "ink-spill". Still further, another alternative may include the line width being allowed to continue to change even as the user draws a line. The latter may be accomplished by defeating the "pen-move" event as an abort or change event.

What is claimed is:

1. An in-place line width selection method for use in a computer based graphics application employing a drawing tool, said method comprising the steps of:

activating a line width selection mode upon an occurrence of a "pen-down" event designating an initial point of contact in a drawing area by the drawing tool;

starting a timer upon the occurrence of said "pen-down" event;

upon expiration of the timer, growing an "ink-spill" to a desired line width dimension at the initial point of contact in the drawing area until an occurrence of either a "pen-up" event or a "pen-move" event; and, entering a graphic line drawing mode with the drawing tool for drawing a graphic line having the desired line width dimension selected according to the "ink-spill" grown in the previous step.

2. The line width selection method of claim 1, further comprising the step of:

stopping the timer and aborting the activation step upon an occurrence of either a "pen-up" event or a "pen-move" event prior to said "ink-still" growing step.

3. The line width selection method of claim 1, further comprising, subsequent to said "ink-spill" growing step, the step of erasing the "ink-spill" upon the occurrence of said "pen-up" event during said "ink-spill" growing step.

4. The line width selection method of claim 1, further wherein said step of entering the graphic line drawing mode includes entering the drawing mode upon the occurrence of said "pen-move" event during said "ink-spill" growing step.

5. The line width selection method of claim 1, wherein said "ink-spill" growing step further includes the step of changing a direction of growth of the "ink-spill" upon an occurrence of a fourth event during said "ink-spill" growing step, the fourth event corresponding to a "single-tap" event.

6. The line width selection method of claim 5, wherein the occurrence of the fourth event during said "ink-spill" growing step results in a change in the direction of growth from incremental to decremental.

7. The line width selection method of claim 5, wherein the occurrence of the fourth event during said "ink-spill" growing step results in a change in the direction of growth from decremental to incremental.

8. An apparatus for implementing in-place line width selection for use in a computer based graphics application employing a drawing tool, said apparatus comprising:

means for activating a line width selection mode upon an occurrence of a "pen-down" event designating an initial point of contact in a drawing area by the drawing tool;

means for starting a timer upon the occurrence of said "pen-down" event;

means operable upon expiration of the timer, and until an occurrence of either a "pen-up" event or a "pen-move" event, for growing an "ink-spill" to a desired line width dimension at the initial point of contact in the drawing area; and, means for entering a graphic line drawing mode with the drawing tool for drawing a graphic line having the desired line width dimension selected according to the "ink-spill" grown.

9. The apparatus of claim 8, further comprising:

means for stopping the timer and aborting said activation means upon an occurrence of either a "pen-up" event or a "pen-move" event prior to operation of said "ink-spill" growing means.

10. The apparatus of claim 8, further comprising means for erasing the "ink-spill" upon the occurrence of said "pen-up" event during a growing of the "ink-spill" by said "ink-spill" growing means.

11. The apparatus of claim 8, further wherein said means for entering the graphic line drawing mode includes means for entering the drawing mode upon the occurrence of said "pen-up" event during a growing of the "ink-spill" by said "ink-spill" growing means.

12. The apparatus of claim 8, wherein said "ink-spill" growing means further includes means for changing a direction of growth of the "ink-spill" upon an occurrence of a fourth event during a growing of the "ink-spill" by said "ink-spill" growing means, the fourth event corresponding to a "single-tap" event.

13. The apparatus of claim 12, wherein the occurrence of the fourth event during the growing of the "ink-spill" by said "ink-spill" growing means results in a change in the direction of growth from incremental to decremental.

14. The apparatus of claim 12, wherein the occurrence of the fourth event during the growing of the "ink-spill" by said "ink-spill" growing means results in a change in the direction of growth from decremental to incremental.

15. A computer based graphics application drawing apparatus comprising:

a drawing cursor input device;

a display device having a drawing display area; and a processor for processing an input received from said drawing cursor input device, said processor processing the input and providing an output to said display device for said display device to display the output in the drawing area, said processor further for implementing an in-place line width selection, wherein the in-place line width selection includes (i) activating a line width selection mode upon an occurrence of a first event carried out by said drawing cursor input device for designating an initial point of contact in the drawing area and starting a timer upon the occurrence of the first event, the first event corresponding to a "pen-down" event, (ii) upon expiration of the activation timer, growing an "ink-spill" to a desired line width dimension at the initial point of contact in the drawing area, until an occurrence of either a "pen-up" event or a "pen-move" event and (iii) entering a graphic line drawing mode with said drawing cursor input device for drawing a graphic line having the desired line width dimension selected according to the "ink-spill" grown.

16. The apparatus of claim 15, wherein activating the in-place line width selection by said processor further includes erasing the "ink-spill" upon the occurrence of said "pen-up" event during a growing of the "ink-spill".

17. The apparatus of claim 15, wherein activating the in-place line width selection by said processor further includes entering the graphic line drawing mode upon the occurrence of said "pen-move" event during a growing of the "ink-spill".

* * * * *